United States Patent [19]
Kim et al.

[11] Patent Number: 5,793,433
[45] Date of Patent: Aug. 11, 1998

[54] APPARATUS AND METHOD FOR VERTICALLY EXTENDING AN IMAGE IN A TELEVISION SYSTEM

[75] Inventors: Jeong-Hoon Kim, Kwacheon; Min-Seung Lee, Seoul, both of Rep. of Korea

[73] Assignee: Samsung Electronics Co., Ltd., Kyungki-do, Rep. of Korea

[21] Appl. No.: 581,491

[22] Filed: Dec. 29, 1995

[30] Foreign Application Priority Data

Mar. 31, 1995 [KR] Rep. of Korea .................. 7533/1995

[51] Int. Cl.$^6$ .................................................. H04N 7/01
[52] U.S. Cl. .................... 348/445; 348/441; 348/458; 348/469; 348/556
[58] Field of Search ........................... 348/441, 445, 348/469, 722, 458, 556

[56] References Cited

U.S. PATENT DOCUMENTS

| | | | |
|---|---|---|---|
| 5,274,449 | 12/1993 | Keesen | 348/469 |
| 5,307,156 | 4/1994 | Yamamoto et al. | 348/445 |
| 5,347,313 | 9/1994 | Choi | 348/445 |
| 5,363,140 | 11/1994 | Isomoto et al. | 348/445 |
| 5,386,236 | 1/1995 | Hong | 348/445 |
| 5,471,249 | 11/1995 | Monta et al. | 348/445 |
| 5,473,381 | 12/1995 | Lee | 348/441 |
| 5,506,625 | 4/1996 | Kim | 348/445 |
| 5,534,934 | 7/1996 | Katsumata et al. | 348/445 |
| 5,537,157 | 7/1996 | Washino et al. | 348/722 |

Primary Examiner—Tommy P. Chin
Assistant Examiner—Frank Snow
Attorney, Agent, or Firm—Sughrue, Mion, Zinn, Macpeak & Seas, PLLC

[57] ABSTRACT

An apparatus and method for extending the height of an image to display a video signal having a 4:3 aspect ratio on a screen having a 16:9 aspect ratio. The apparatus includes: a field memory for storing pixel data of horizontal scanning lines of an input region which will be extended vertically, among the horizontal scanning lines of a field unit being inputted, and outputting the pixel data of the horizontal scanning lines of a region which will be extended vertically among the stored pixel data; line memories for sequentially inputting and delaying the pixel data outputted from the field memory by a horizontal scanning line unit, the number of the line memories corresponding to a vertical extension rate of the image; and a low-pass filtering and sub-sampling part for low-pass filtering and sub-sampling by respectively multiplying different filter coefficients having values determined by positions of new vertically extended horizontal scanning lines by the pixel data of the horizontal scanning lines which are each outputted with a different delay from the line memories and by adding the multiplied pixel data in correspondence with the positions of the new horizontal scanning lines, to thereby output the pixel data of the vertically extended horizontal scanning lines.

11 Claims, 12 Drawing Sheets

FIG. 18

APPARATUS AND METHOD FOR VERTICALLY EXTENDING AN IMAGE IN A TELEVISION SYSTEM

BACKGROUND OF THE INVENTION

The present invention relates to a television system for displaying an image of a letter box format having a 4:3 aspect ratio on a screen having a 16:9 aspect ratio, and more particularly to an apparatus and method for extending in a vertical direction a vertical height of an image having either a letter box size or a cinemascope size and displaying the extended image on a screen having a 16:9 aspect ratio.

Until now, most display formats for television systems have had a 4:3 aspect ratio. This aspect ratio is used for both a screen of a projection television system and a display means embodied by an image display region of a general cathode ray tube. The aspect ratio of most video sources is also 4:3.

However, not all video sources are created with a 4:3 aspect ratio. For example, cinema sources are converted from a film format to a video tape format in order to be reproduced or transmitted as a television signal. When such cinema sources are transformed to video format, the aspect ratio has been conventionally transformed to the 4:3 aspect ratio adapted to most television devices. One example of the cinema source is wide screen sources having a 16:9 aspect ratio display format. When such cinema sources are transformed to video tape format, a device such as a flying spot telecine is used. The flying spot telecine has a window and frame having the 4:3 aspect ratio. In general, the operator cuts down a left and right portion of the image as necessary while tracking a center portion of action in a film, and simultaneously moves the window to the left and right. The reason for this is that the horizontal width of the film image is wider than the horizontal width of the 4:3 aspect ratio screen in the case of a vertical height of the film image being adapted to the 4:3 aspect ratio screen. Accordingly, a portion of the video signal transformed from the 16:9 aspect ratio of the cinema source to the 4:3 aspect ratio is lost because much of the left and right portions of the film image are cut down.

If the wide screen image is decreased in scale until the horizontal width coincides with a left and right boundary line of the 4:3 aspect ratio screen, the vertical height of the image is smaller. As a result, the film source image is fully displayed on the 4:3 aspect ratio screen, but there are upper and lower portions of the 4:3 aspect ratio screen which are not filled in. In the same manner as above, in order to avoid a spurious signal being generated in a portion of the screen on which the image is not displayed, a dark bar is transmitted to the upper and lower portions of the image transformed to the 4:3 aspect ratio. The particular display format processed as described above is generally called "the letter box format". Accordingly, a letter box signal can be thought of as a video signal having a smaller active screen portion than that of a general video signal.

Video signals of letter box format can be, for example, a letter box size or a cinemascope size. And, for example, the video signal of the letter box size has 360 effective horizontal scanning lines, and the video signal of the cinemascope size has 320 effective horizontal scanning lines.

Figure 1:
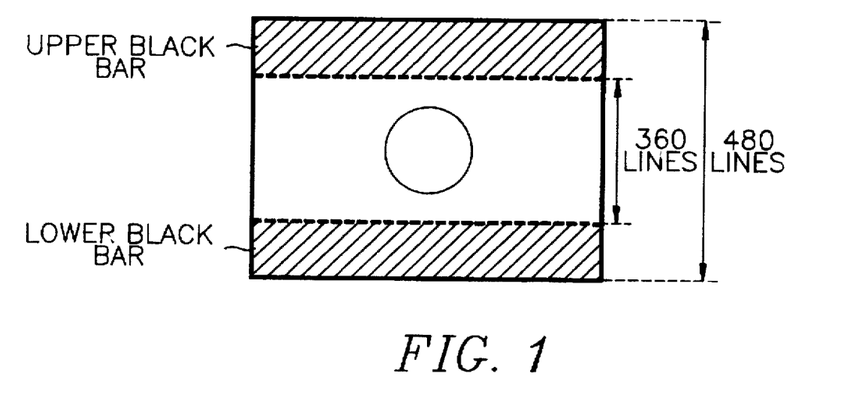
FIG. 1 is a view illustrating one example of a display state when an image of a letter box format is displayed on a screen having a 4:3 aspect ratio.

FIG. 1 illustrates a display state having upper and lower black bars when the image of the letter box size is displayed on the 4:3 aspect ratio screen having, for example, 360 effective horizontal scanning lines. In the same manner, the display has upper and lower black bars when the image of the cinemascope size is displayed on the 4:3 aspect ratio screen, but the number of effective horizontal scanning lines is reduced to 320 lines.

Figure 2:
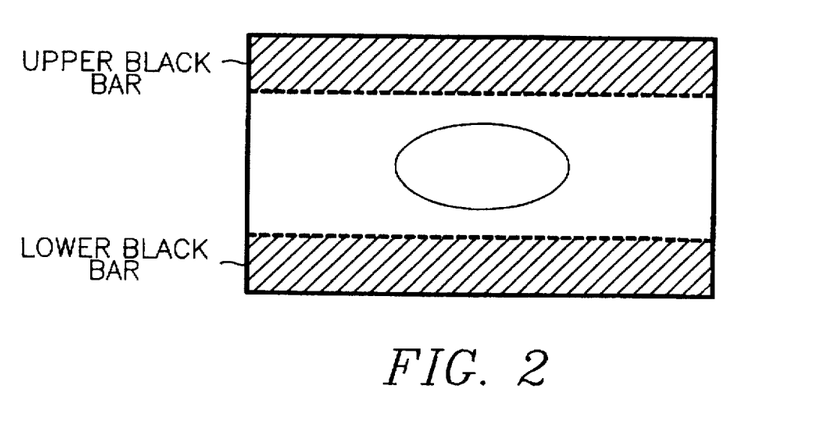
FIG. 2 is a view illustrating one example of a display state when an image of a letter box format is displayed on a screen having a 16:9 aspect ratio.

If the image of the letter box or cinemascope size as described above is displayed on a television screen having a 16:9 aspect ratio without an additional signal process, an incompatibility phenomenon is generated which causes the image of the video source to be spread to the left and right as shown in FIG. 2.

Figure 3:
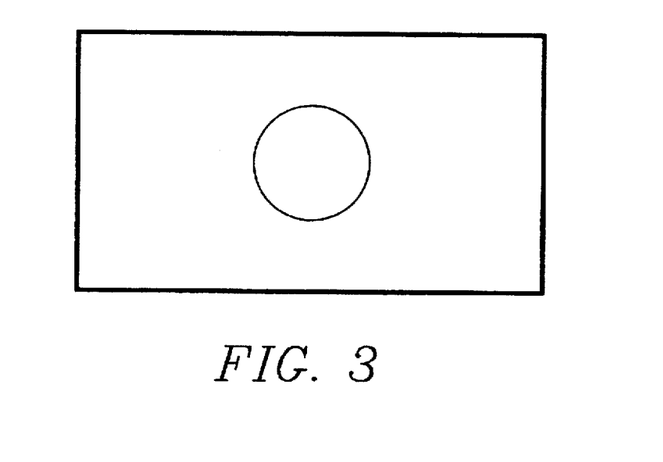
FIG. 3 is a view illustrating a state when an image of a letter box format is extended vertically to be displayed on a screen having a 16:9 aspect ratio.

In order to prevent the incompatibility phenomenon as described above, the vertical height of the image of letter box or cinemascope size should be extended, so that, as shown in FIG. 3, the image of the video source is not spread to the left and right, even when displayed on a television screen having a 16:9 aspect ratio and so that the upper and lower black bars are not displayed.

Accordingly, several techniques for extending the vertical height of the image of the letter box or cinemascope size have been suggested.

Figure 4:
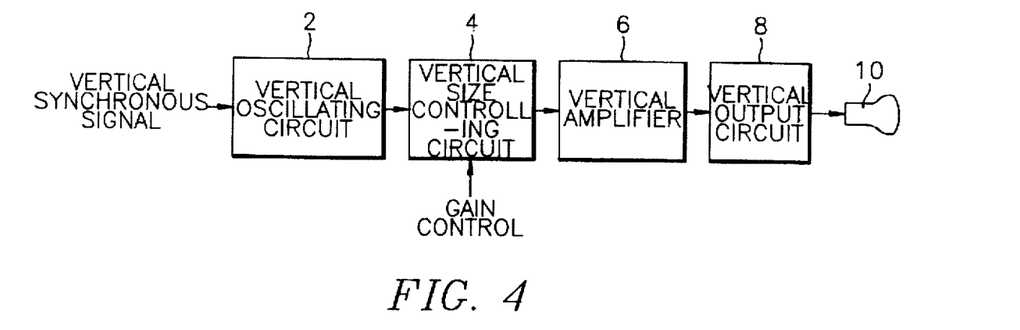
FIG. 4 is a block diagram illustrating vertical extension of an image of a video source used in a conventional vertical deflection system.

One of the techniques is to utilize a vertical deflection system of the television device. As shown in FIG. 4, the vertical height of the image of the letter box or cinemascope size is extended by controlling a gain of a vertical size control circuit 4 provided for a general vertical deflection circuit. In general, the vertical size control circuit 4 is used for controlling the vertical size of a raster, and it has a function of changing a voltage level of a saw wave oscillated by a vertical oscillating circuit 2, in proportion to the gain being controlled by an element such as a variable resistor. The saw wave voltage controlled by the vertical size control circuit 4 is amplified by a vertical amplifier 6 and then is applied to a vertical output circuit 8, to thereby accomplish the vertical deflection in a CRT 10. Therefore, the gain of the vertical size control circuit 4 is increased as much as the vertical height of the image is extended according to the letter box or cinemascope size, so that as shown in FIG. 3, the image of the video source is not spread toward the left and right, even when displayed on a television screen having a 16:9 aspect ratio, and the upper and lower black bars are not displayed.

However, there is a drawback in that the degree of resolution is reduced because the interval between the horizontal scanning lines is widened due to the vertical height of the video image being extended.

Figure 5:
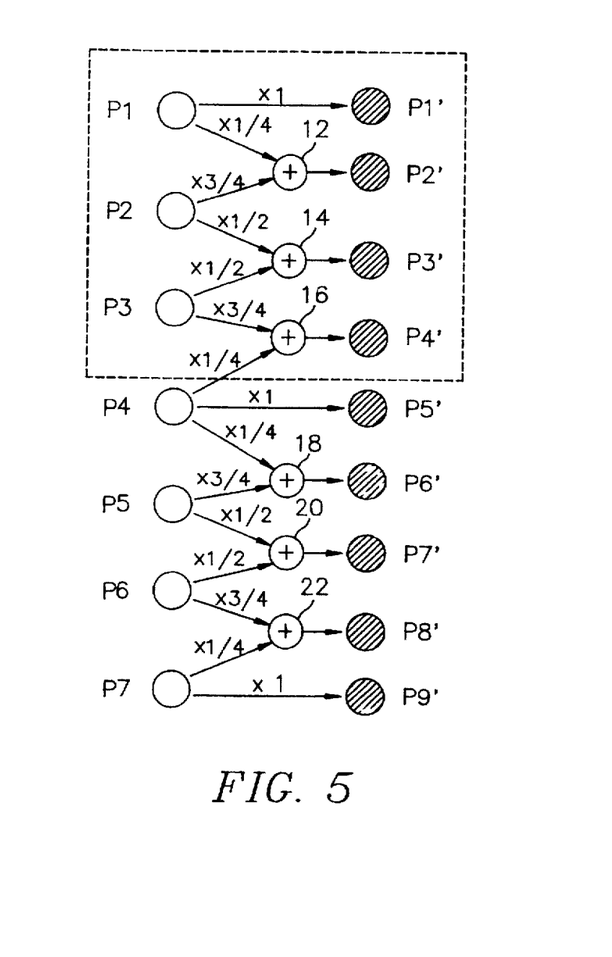
FIG. 5 is a view diagram illustrating vertical extension of an image of a video source by a conventional distance inverse proportion coefficient.

Another technique for extending the vertical height of the image of the letter box or cinemascope size is to utilize "the distance inverse proportion coefficient". FIG. 5 illustrates one example of vertically extending the image of the letter box size using the distance inverse proportion coefficient. According to this example, the source video signal has seven horizontal scanning lines. Referring to FIG. 5, a coefficient inversely proportional to the distance between pixels P1 to P7 of the source video signal and pixels which will be reconstructed is multiplied by a pixel value of the source video signal, and then two adjacent values of the multiplied values are each added by adders 12 to 22, to thereby generate new pixels P1' to P9'. At this time, a basic processing unit is a block drawn in a dotted line, wherein three pixels of the horizontal scanning lines of the source video signal are processed to thereby reconstruct four pixels of the horizontal scanning lines. Accordingly, the widening of the interval between the horizontal scanning lines which can be perceived by the human eye is prevented, unlike the deflection system as described above.

However, there has been a problem that the resolution degree is still decreased in the case of vertically extending a video signal by an interpolation method using the distance inverse proportion coefficient as described above. Furthermore, there has been a problem that the coefficient should be changed every field when the source video employs an interlaced scanning method, while conversely a single coefficient should be used after interpolating when the source video employs a sequential scanning method.

SUMMARY OF THE INVENTION

Accordingly, an object of the present invention is to provide a vertical extension apparatus and method thereof for extending a vertical height of an image of a letter box format having a 4:3 aspect ratio, to thereby improve the degree of resolution when displayed on a 16:9 aspect ratio screen.

Another object of the present invention is to provide a vertical extension apparatus and method thereof for allowing identical processing irrespective of the scanning method of the video source when the vertical height of the image is extended, to thereby display a video of letter box format having a 4:3 aspect ratio on a screen having a 16:9 aspect ratio.

According to an aspect of the present invention, there is provided a vertical extension apparatus comprising a field memory for storing pixel data of horizontal scanning lines of an input region which will be extended vertically, among the horizontal scanning lines of a field unit being inputted, and outputting the pixel data of the horizontal scanning lines of a region which will be extended vertically among the stored pixel data; line memories for sequentially inputting and delaying the pixel data outputted from the field memory by the horizontal scanning line unit, the number of the line memories corresponding to a vertical extension rate of the image; and a low-pass filtering and sub-sampling part for low-pass filtering and sub-sampling by respectively multiplying different filter coefficients which are determined according to the positions of the new vertically extended horizontal scanning lines, by the pixel data of each of the differently delayed horizontal scanning lines outputted from the line memories and by adding the multiplied pixel data in correspondence with the positions of the new horizontal scanning lines, to thereby output the pixel data of the vertically extended horizontal scanning lines.

According to another aspect of the present invention, there is provided a vertical extension method comprising the steps of inserting a number of pixel data having zero value, the number being set in accordance with the vertical extension rate, between each of the pixels of the horizontal scanning lines for an input video signal having an image which is to be extended in vertical height; and generating new horizontal scanning lines for use in vertically extending the image by multiplying filter coefficients, the values of which are determined by a position of a corresponding one of the new horizontal scanning lines being generated, by every $n^{th}$ pixel of the zero-inserted signal, wherein n is one more than the number of the zero value pixel data inserted between each of the pixels of the horizontal scanning lines, thereby producing a spectrum elimination signal, and then sub-sampling the spectrum elimination signal in accordance with the vertical extension ratio.

BRIEF DESCRIPTION OF THE DRAWINGS

FIGS. 7(A) to (E) are views illustrating processing states of pixels in accordance with a vertical extension in a first embodiment of the present invention.

DETAILED DESCRIPTION OF THE PREFERRED EMBODIMENTS

In the following detailed description, particular details such as a detailed process procedure, a circuit construction, the number of horizontal scanning lines, and the filter coefficient are provided for a more comprehensive understanding of the present invention. It is evident that a person who has ordinary knowledge in the present technical field can easily execute the subject matter of the present invention without description of the particular details. For the sake of clarity, known functions and construction of the present invention are not described in detail.

In order to improve resolution and to allow identical processing irrespective of a scanning method of a video source when a vertical height of a image of letter box or cinemascope size is extended as described in FIG. 3, the present invention varies the number of scanning lines of a video source on the basis of "the general sampling rate conversion theory". The sampling rate conversion theory relates to converting a sampling rate by sequentially interpolating, filtering processing, and decimating an input signal, and is disclosed in p35–p40 of "MULTIRATE DIGITAL SIGNAL PROCESSING" by Ronald E. Crochiere and Lawrence R. Rabiner, published by Prentice-Hall Co., U.S.A., in 1983.

Figure 6:
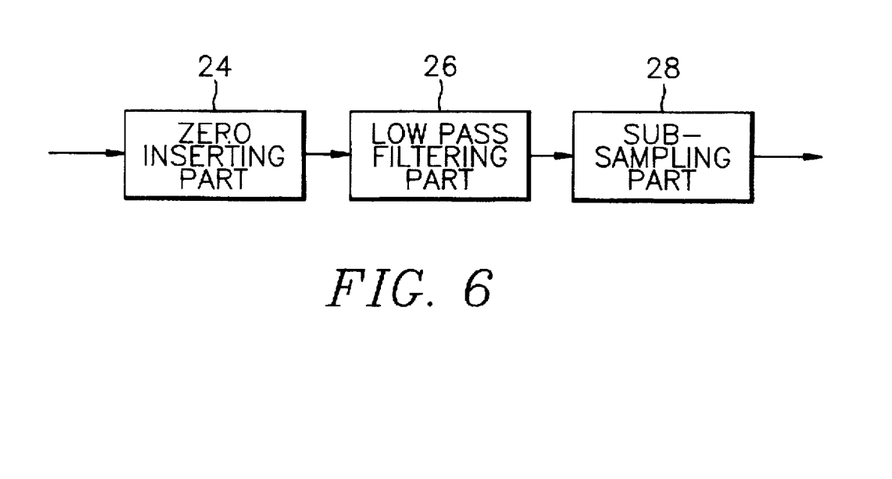
FIG. 6 is a block diagram illustrating a construction of a vertical extension apparatus according to the present invention.

FIG. 6 is a block diagram illustrating a construction of a vertical extension apparatus according to the present invention which is configured on the basis of the sampling rate conversion theory. A zero inserter 24 performs interpolation by inserting pixels having zero value between the pixels of horizontal scanning lines. The number of inserted pixels is equal to the number of pixels being set for the inputted video signal of a letter box format. A low-pass filtering part 26 multiplies the different filter coefficients which are determined according to the positions of the new horizontal scanning lines which are extended in a vertical direction of a zero-inserted signal by the zero-inserter 24, by the pixel data of each of the differently delayed horizontal scanning lines outputted from the line memories and by adding the multiplied pixel data in correspondence with the positions of the new horizontal scanning lines, to thereby perform low-pass filtering. A sub-sampling part 28 performs sub-sampling of the signal filtered by the low-pass filtering part 26 at a set rate in the vertical direction.

EMBODIMENT 1

In a first embodiment of the present invention, the vertical height of an image of letter box size having 360 effective horizontal scanning lines is extended to thereby be converted to an image having 480 effective horizontal scanning lines by use of the vertical extension apparatus of FIG. 6 as described above. At this time, the 480 new horizontal scanning lines are generated from the 360 horizontal scanning lines, that is, the number of new horizontal scanning lines is 4/3 times the number of the horizontal scanning lines of an initial signal. Therefore, four new horizontal scanning lines are generated for every three horizontal scanning lines of the initial signal. The initial signal represents a signal having a letter box size image.

Figure 7A:
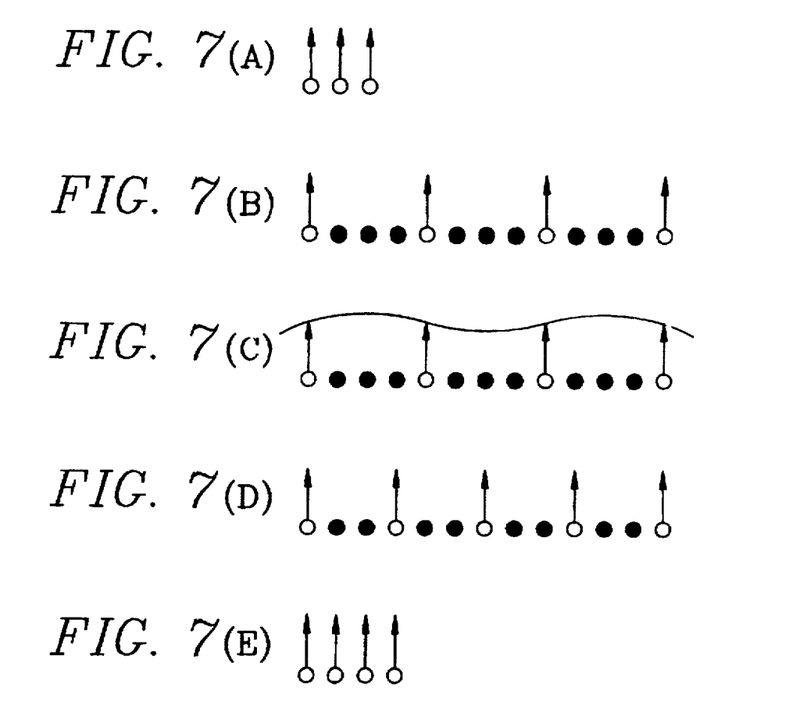
Figure 8A:
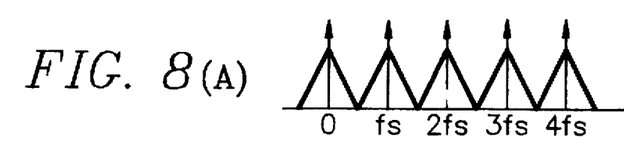
FIGS. 8(A) to (D) are views illustrating spectrum changes in accordance with a vertical extension in the first embodiment of the present invention.
Figure 8B:
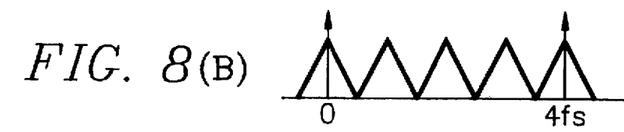
Figure 8C:
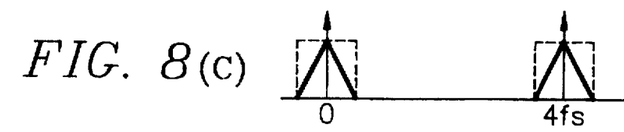
Figure 8D:
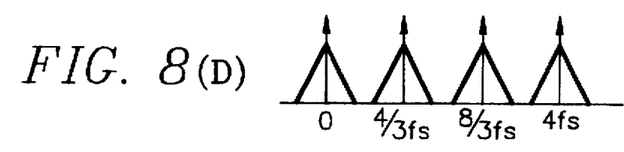

Referring to FIG. 7 which illustrates processing states of the pixels in accordance with a vertical extension, a vertical extension process according to a first embodiment of the present invention is described as follows. Twelve pixels are generated by inserting three pixels having zero value between each of the pixels of the horizontal scanning lines as shown in FIG. 7(B) for every three horizontal scanning lines of the initial signal as shown in FIG. 7(A). After a spectrum between 0 and 4 fs is eliminated by performing low-pass filtering as shown in FIG. 7(C), the sub-sampling shown in FIG. 7(D) extracts one of three pixels to thereby generate the pixels of the four new horizontal scanning lines as shown in FIG. 7(E). In FIG. 7, the pixels colored in black are the pixels having zero value, and "fs" is a color sub-carrier.

FIG. 8 is a view illustrating spectrum changes in accordance with a vertical extension of the first embodiment of the present invention. FIG. 8A illustrates the spectrum of the initial signal as shown in FIG. 7(A); FIG. 8B illustrates the spectrum of the zero-inserted signal as shown in FIG. 7(B); FIG. 8C illustrates the spectrum of the low-pass-filtered signal as shown in FIG. 7(C); and FIG. 8D illustrates the last spectrum change in which the spectrum of 4 fs is changed into the spectrum of 4/3 fs.

Figure 9:
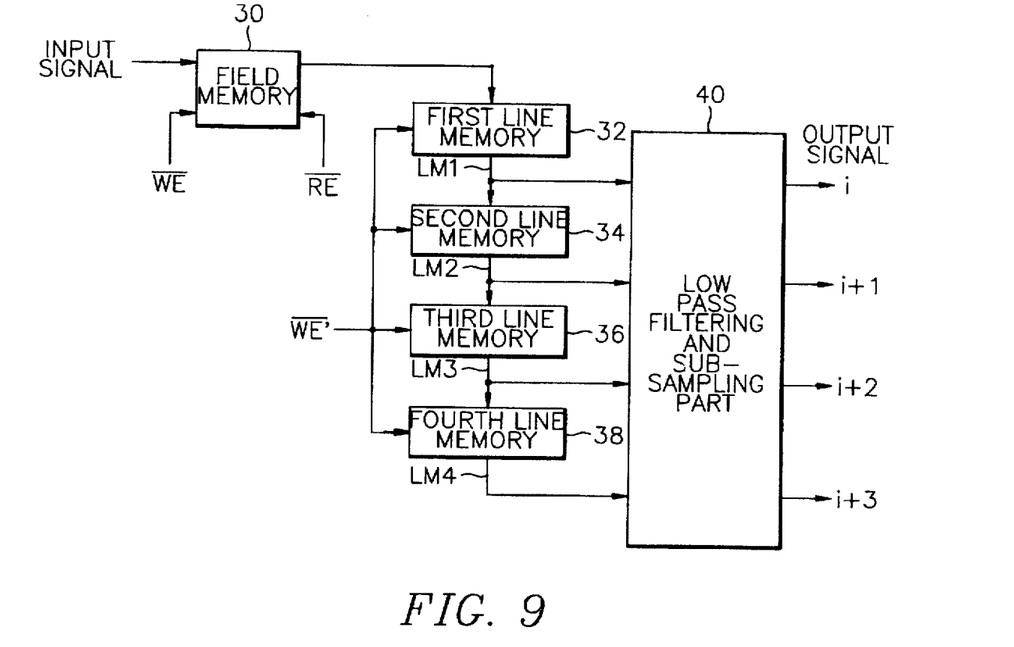
FIG. 9 is a block diagram illustrating a construction of a vertical extension apparatus in the first embodiment of the present invention.
Figure 10:
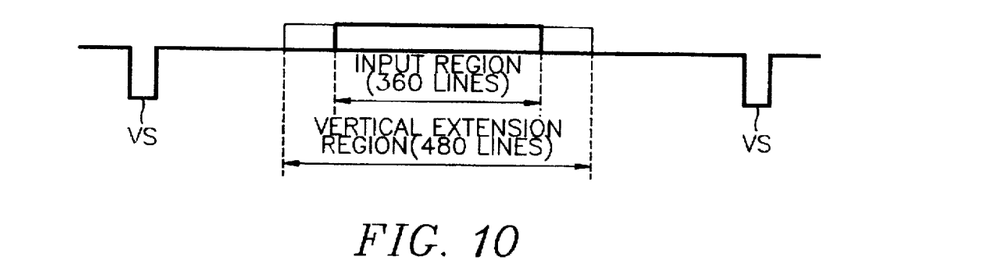
FIG. 10 is a diagram illustrating an input/output timing of field memory 30 of the FIG. 9 apparatus.

Referring to FIG. 9 which illustrates a construction of the vertical extension apparatus of the first embodiment of the present invention, a field memory 30 stores the pixel data of the horizontal scanning lines of an input region which will be vertically extended, among the horizontal scanning lines of an input signal of a field unit being inputted, and then outputs the pixel data of the horizontal scanning lines of a region which will be extended vertically, among the stored pixel data. At this time, as shown in FIG. 10, the input region of the field memory 30 is set to a period of storing data to the field memory 30 by a write signal $\overline{WE}$, and an extension region is set to a period of being read from the field memory 30 by a read signal $\overline{RE}$. Regarding the total number of horizontal scanning lines per frame, the input region is set to correspond to 360 horizontal scanning lines and the extension region is set to correspond to 480 horizontal scanning lines. In FIG. 10, "VS" signifies a vertical synchronous signal.

Figure 11:
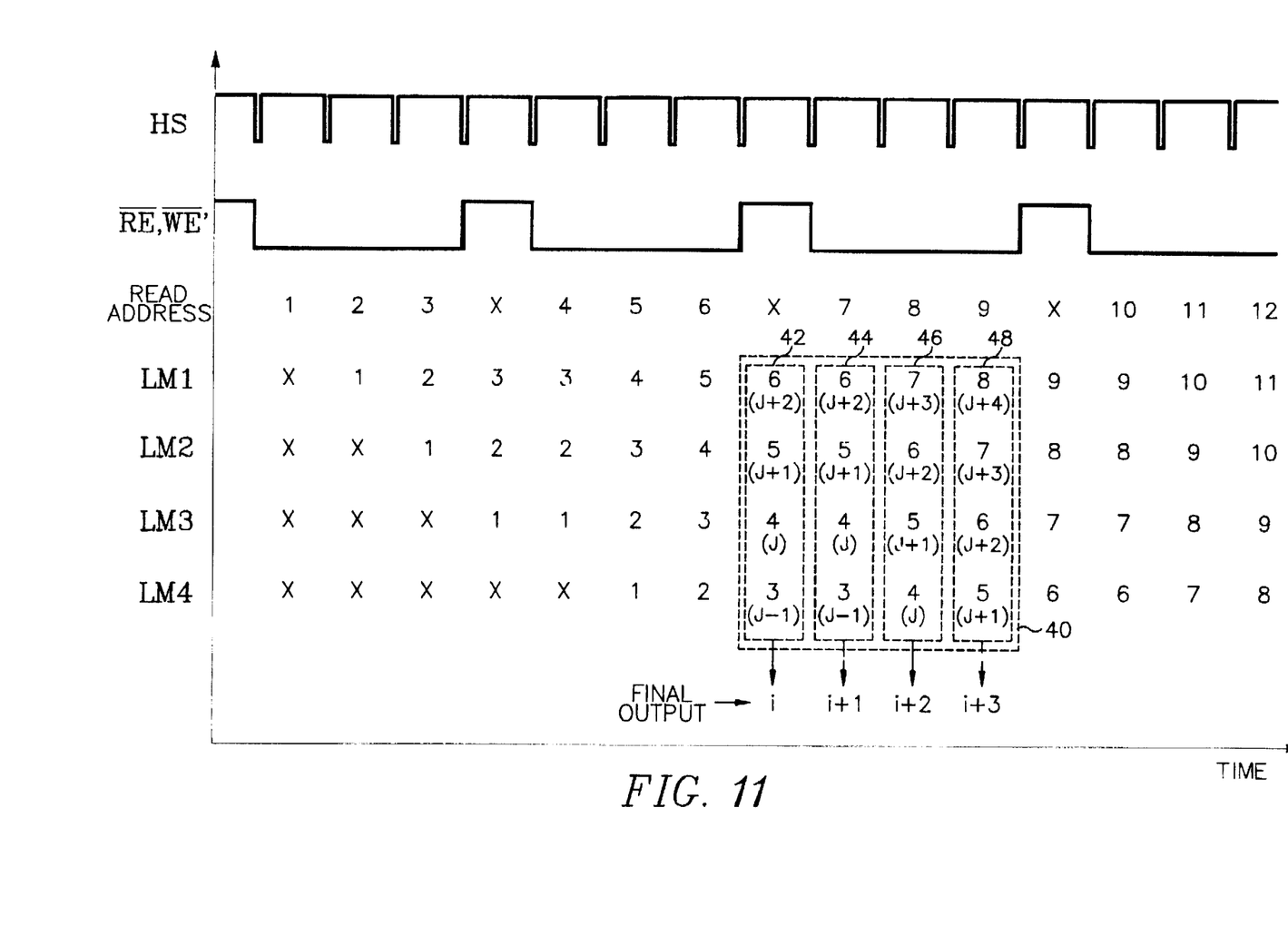
FIG. 11 is a diagram illustrating operation timing and operation steps of the FIG. 9 apparatus.

First, second, third, and fourth line memories 32 to 38 sequentially input and delay the pixel data outputted from the field memory 30 in the horizontal scanning line unit, and then output the pixel data to the low-pass filtering and sub-sampling part 40. At this time, as shown in FIG. 11, the read signal $\overline{RE}$ is inputted in a "high" state to the field memory 30 during the period of one horizontal scanning line of every three horizontal scanning lines to thereby disable an output of the field memory 30, so that the extension region during the period of the 480 horizontal scanning lines (which is 4/3 times the 360 horizontal scanning lines) is designated as in FIG. 10. And in the same manner as the read signal $\overline{RE}$, the write signal $\overline{WE}$ designating an input period of the first, second, third, and fourth line memories 32 to 38 also are inputted to the first, second, third, and fourth line memories 32 to 38 in the "high" state during the period of one horizontal scanning line of every three horizontal scanning lines. And a read address for the field memory 30 is increased every horizontal scanning line during the period when the read signal $\overline{RE}$ and the write signal $\overline{WE}$ are in a "low" state as shown in FIG. 11. Accordingly, the first, second, third, and fourth line memories 32 to 38 delay the pixel data of each inputted horizontal scanning line in the horizontal scanning line unit during the period when the read signal $\overline{RE}$ and the write signal $\overline{WE}$ are in the "low" state as shown in FIG. 11, and retain the pixel data of previous horizontal scanning lines during the period in which the read signal $\overline{RE}$ and the write signal $\overline{WE}$ are in the "high" state. As a result, each horizontal scanning line outputted from the first, second, third, and fourth line memories 32 to 38 is rendered to be as in FIG. 11. In FIG. 11, "HS" designates a horizontal synchronous signal.

The low-pass filtering and sub-sampling part 40 performs low-pass filtering and sub-sampling by multiplying each of the different filter coefficients determined by the positions of the new vertically extended horizontal scanning lines i to (i+1) by the pixel data LM1 to LM4 of the different horizontal scanning lines which are each delay-outputted from the first, second, third, and fourth line memories 32 to 38, and by adding the multiplied pixel data in correspondence with the positions of the new horizontal scanning lines i to (i+3), to thereby output the pixel data i to (i+3) of the vertically extended horizontal scanning lines. At this time, the four new horizontal scanning lines are generated from the three horizontal scanning lines of the input video signal.

Figure 12:
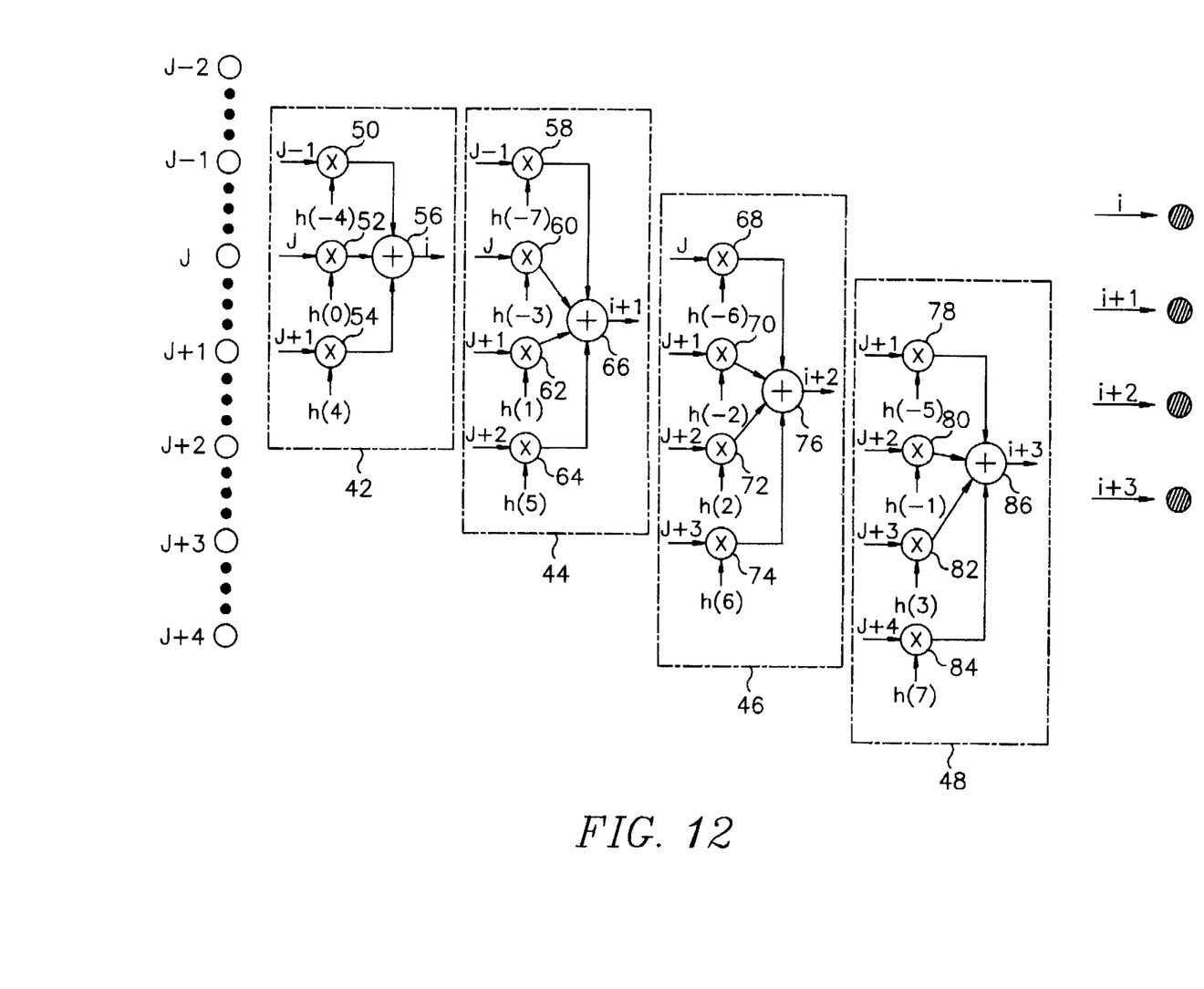
FIG. 12 is a view illustrating one example of a detailed construction of a low-pass filtering and sub-sampling part 40 of the FIG. 9 apparatus.

One example of the construction of the low-pass filtering and sub-sampling part 40 is shown in FIG. 12. In FIG. 12, for example, (J−2) to (J+4) represent the initial pixels in the vertical direction of seven consecutive horizontal scanning lines, and the pixels colored in black are the pixel data having zero value, three of which are inserted between each of the initial pixels (J–2) to (J+4). Furthermore, slashed pixels represent the four new pixels i, (i+1), (i+2), and (i+3) generated from the three initial pixels J, (J+1), and (J+2). At this time, the three initial pixels J, (J+1), and (J+2) are converted into twelve pixels by zero-insertion. Accordingly, a total of twelve low-pass filters would normally be needed. However, only four results of the low-pass filtering are needed because one of the three zero-inserted pixels is extracted by performing the sub-sampling as described above among the twelve zero-inserted pixels. Consequently, only four low-pass filters are required; that is, the first, second, third, and fourth low-pass filters 42 to 48. At this time, in performing the low-pass filtering, the pixels having zero value are rendered to be zero even though they are multiplied by the filter coefficients. Therefore, only the initial pixels are multiplied by the filter coefficient and the pixels having zero value are not multiplied by the filter coefficients, thereby performing a zero insertion process without actually performing zero insertion.

Accordingly, multipliers 50 to 54 of the first low-pass filter 42 respectively multiply the initial pixels (J–1), J and (J+1) by the filter coefficients h(–4), h(0), and h(4), and adder 56 adds all outputs of the multiplier 50 to 54, to thereby generate new pixel i. At this time, because the filter coefficients are not multiplied by the pixels having zero value, the filter coefficients h(–7), h(–6), h(–5), h(–3) , h(–2) , h(–1), h(1), h(2), h(3), h(5), h(6), and h(7) are not used. Multipliers 58 to 64 of the second low-pass filter 44 respectively multiply the initial pixels (J–1), J, (J+1), and (J+2) by the filter coefficients h(–7), h(–3), h(1), and h(5), and adder 66 adds all outputs of the multipliers 58 to 64, to thereby generate new pixel (i+1). At this time, because the filter coefficients are not multiplied by the pixels having zero value, the filter coefficients h(–6), h(–5), h(–4), h(–2), h(–1), h(0), h(2), h(3), h(4), h(6), and h(7) are not used. Furthermore, multipliers 68 to 74 of the third low-pass filter 46 respectively multiply the initial pixels J, (J+1), (J+2), and (J+3) by the filter coefficients h(–6), h(–2), h(2), and h(6), and adder 76 adds all outputs of the multipliers 68 to 74, to thereby generate new pixel (i+2). At this time, because the filter coefficients are not multiplied by the pixels having zero value, the filter coefficients h(–7), h(–5), h(–4), h(–3), h(–1), h(0), h(1), h(3), h(4), h(5), and h(7) are not used. And furthermore, multipliers 78 to 84 of the fourth low-pass filter 48 respectively multiply the initial pixels (J+1), (J+2), (J+3), and (J+4) by the filter coefficients h(–5), h(–1), h(3), and h(7) and adder 86 adds all outputs of the multipliers 78 to 84, to thereby generate new pixel (i+3). At this time, because the filter coefficients are not multiplied by the pixels having zero value, the filter coefficients h(–7), h(–6), h(–4), h(–3), h(–2), h(0), h(1), h(2), h(4), h(5), and h(6) are not used.

As a result, the four new pixels i, (i+1), (i+2), and (i+3) of the horizontal scanning lines which are vertically extended from the three initial pixels J, (J+1), and (J+2) of the horizontal scanning lines are generated.

The vertical height of the image of letter box size having 360 effective horizontal scanning lines is extended by sequentially repeating the above steps every three horizontal scanning lines, to thereby convert the image to one having 480 effective horizontal scanning lines. Accordingly, even in the television screen having a 16:9 aspect ratio as shown in FIG. 3, the image of the video source is not spread to the left and right and at the same time the upper and lower black bars do not appear.

Also in case that the three horizontal scanning lines J, (J+1), and (J+2) are extended as described above to thereby generate the four horizontal scanning lines i, (i+1), (i+2), and (i+3), that is, in case that the three initial pixels are converted to four pixels, the six pixels (J–1) to (J+4) of the horizontal scanning lines are required as shown in FIG. 12. This can be more readily understood by referring to FIG. 11 where pixels which are processed in the first, second, third, and fourth low-pass filter 42 to 48 of the low-pass filtering and sub-sampling part 40 are separately illustrated in a dotted line block.

On the other hand, if the write signal $\overline{WE}$ and the read signal $\overline{RE}$ for the field memory 30 are controlled to thereby move the sections of the input region and the vertical extension region as shown in FIG. 10, the screen can be moved in the vertical direction.

EMBODIMENT 2

In a second embodiment of the present invention, the vertical height of the image of the cinemascope size having 320 effective horizontal scanning lines is extended to be converted to an image having 480 effective horizontal scanning lines using the vertical extension apparatus of FIG. 6 as described above. At this time, the 480 new horizontal scanning lines are generated from the 320 horizontal scanning lines; that is, the number of the new horizontal scanning lines is 3/2 times the number of the horizontal scanning lines of an initial signal. Therefore, three new horizontal scanning lines are generated for every two horizontal scanning lines of the initial signal. The initial signal represents a signal having an image of cinemascope size.

Figure 13A:
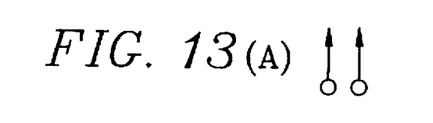
FIGS. 13(A) to (E) are views illustrating processing states of pixels in accordance with a vertical extension in a second embodiment of the present invention.
Figure 13B:
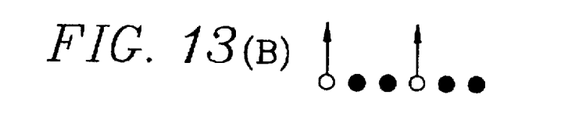
Figure 13C:
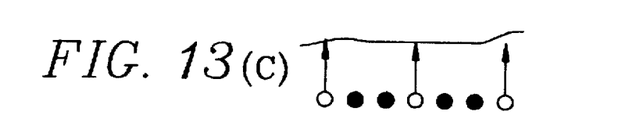
Figure 13D:
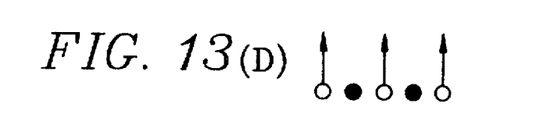
Figure 13E:
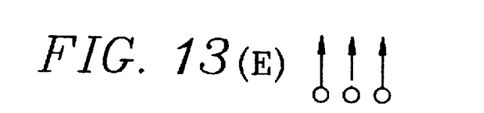
Figure 14A:
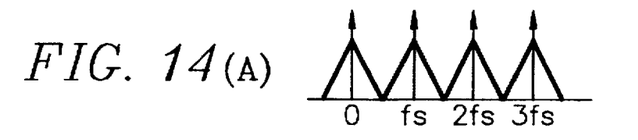
FIGS. 14(A) to (D) are views illustrating spectrum changes in accordance with a vertical extension in the second embodiment of the present invention.
Figure 14B:
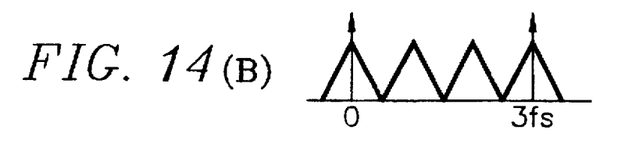
Figure 14C:
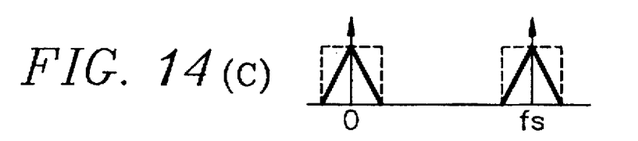
Figure 14D:
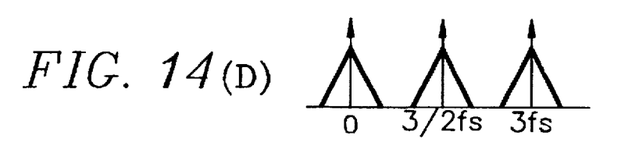

A vertical extension process according to the second embodiment of the present invention will be described with reference to FIG. 13, which illustrates processing states of the pixels in accordance with a vertical extension. Six pixels are generated by inserting two pixels having zero value between each of the pixels of the horizontal scanning lines, as shown in FIG. 13(B), for every two horizontal scanning lines of the initial signal, as shown in FIG. 13(A). Then, after a spectrum between 0 and 3 fs is eliminated by performing low-pass filtering as shown in FIG. 13(C), every other pixel is extracted by sub-sampling as shown in FIG. 13(D), to thereby generate the pixels of the three new horizontal scanning lines as shown in FIG. 13(E). In FIG. 13, the pixels colored in black correspond to pixel data having zero value, and "fs" designates a color sub-carrier.

FIG. 14 is a view illustrating spectrum changes in accordance with a vertical extension of the second embodiment of the present invention. FIG. 14A illustrates the spectrum of the initial signal as shown in FIG. 13(A), FIG. 14B illustrates the spectrum of the zero-inserted signal as shown in FIG. 13(B), FIG. 14C illustrates the spectrum of the low-pass-filtered signal as shown in FIG. 13(C), and FIG. 14D illustrates the last spectrum change in which the spectrum of 3 fs is changed into the spectrum of 3/2 fs.

Figure 15:
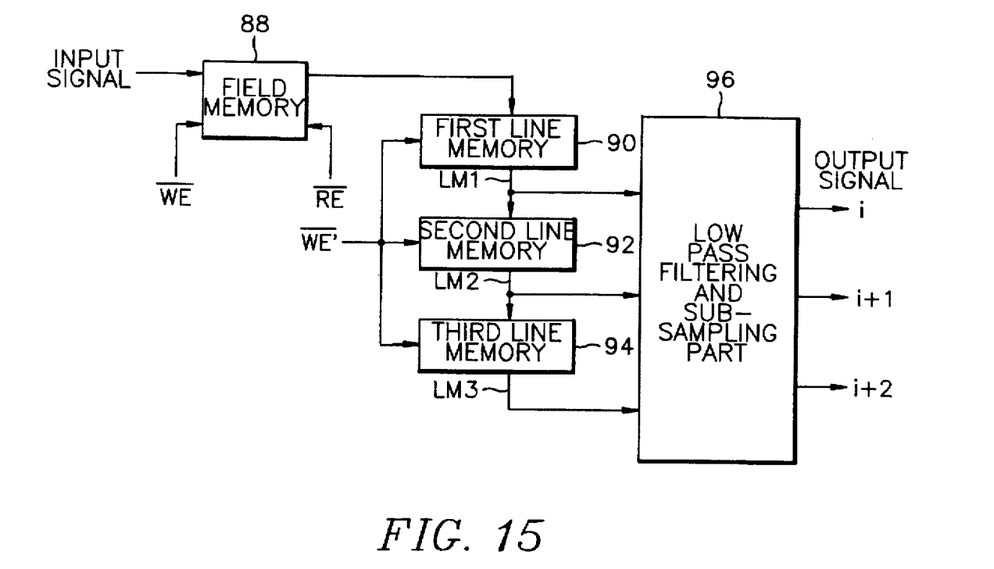
FIG. 15 is a block diagram illustrating a construction of a vertical extension apparatus in a second embodiment of the present invention.
Figure 16:
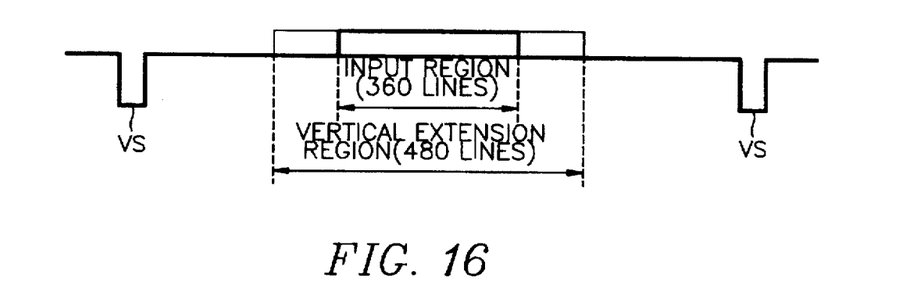
FIG. 16 is a diagram illustrating an input/output timing of a field memory 88 shown in FIG. 15.

Referring to FIG. 15 which illustrates a construction of the vertical extension apparatus of the second embodiment according to the present invention, a field memory 88 stores the pixel data of the horizontal scanning lines of an input region which will be vertically extended, among the horizontal scanning lines of an input signal of a field unit being inputted, and then outputs the pixel data of the horizontal scanning lines of a region which will be extended vertically, among the stored pixel data. At this time, as shown in FIG. 16, the input region of the field memory 88 is set to a period of being stored to the field memory 88 by a write signal $\overline{WE}$, and an extension region is set to the period of being read from the field memory 88 by a read signal $\overline{RE}$. Regarding the total number of horizontal scanning lines per frame, the input region is set to 320 horizontal scanning lines and the extension region is set to 480 horizontal scanning lines. In FIG. 16, "VS" represents a vertical synchronous signal.

Figure 17:
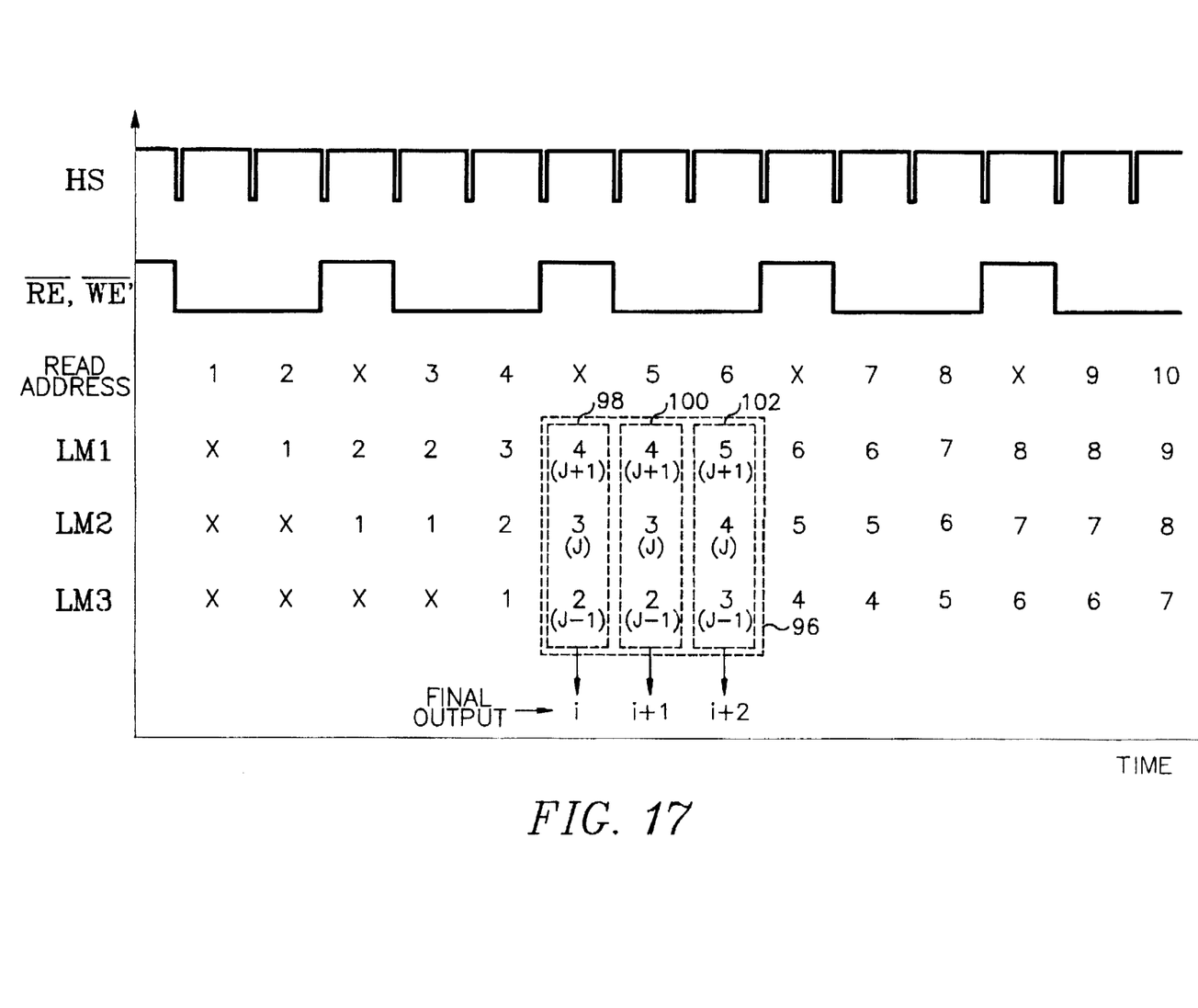
FIG. 17 is a diagram illustrating an operation timing and operation steps of the FIG. 15 apparatus.

First, second, and third line memories 90 to 94 sequentially input and delay the pixel data outputted from the field memory 88 in the horizontal scanning line unit, and then output the pixel data to the low-pass filtering and sub-sampling part 96. At this time, as shown in FIG. 17, the read signal $\overline{RE}$ is inputted in a "high" state to the field memory 88 during the period of one horizontal scanning line of two horizontal scanning lines to thereby disable an output of the field memory 88, so that the extension region during the period of the 480 horizontal scanning lines (3/2 times 320 horizontal scanning lines) is designated as in FIG. 16. And in the same manner of the read signal $\overline{RE}$, the write signal $\overline{WE'}$ designating an input period of the first, second, and third line memories 90 to 94, is also inputted to the first, second, and third line memories 90 to 94 in the "high" state during the period of one horizontal scanning line of two horizontal scanning lines. And a read address for the field memory 88 is increased every horizontal scanning line during the period of which the read signal $\overline{RE}$ and the write signal $\overline{WE'}$ are in a "low" state as shown in FIG. 17. Accordingly, the first, second, and third line memories 90 to 94 delay the pixel data of each inputted horizontal scanning line in the horizontal scanning line unit during the period in which the read signal $\overline{RE}$ and the write signal $\overline{WE'}$ are in the "low" state as shown in FIG. 17, and retain the pixel data of previous horizontal scanning lines during the period in which the read signal $\overline{RE}$ and the write signal $\overline{WE'}$ are in the "high" state. As a result, each horizontal scanning line outputted from the first, second, and third line memories 90 to 94 is rendered to be as shown in FIG. 17. In FIG. 17, "HS" refers to a horizontal synchronous signal.

The low-pass filtering and sub-sampling part 96 performs low-pass filtering and sub-sampling by multiplying the different filter coefficients determined by the positions of the new vertically extended horizontal scanning lines i to (i+2) by the pixel data LM1 to LM3 of the different horizontal scanning lines which are each delay-outputted from the first, second, and third line memories 90 to 94, and by adding the multiplied pixel data in correspondence with the positions of the new horizontal scanning lines i to (i+2), to thereby output the pixel data i to (i+2) of the vertically extended horizontal scanning lines. At this time, the three new horizontal scanning lines are generated from the two horizontal scanning lines of the input video signal.

Figure 18:
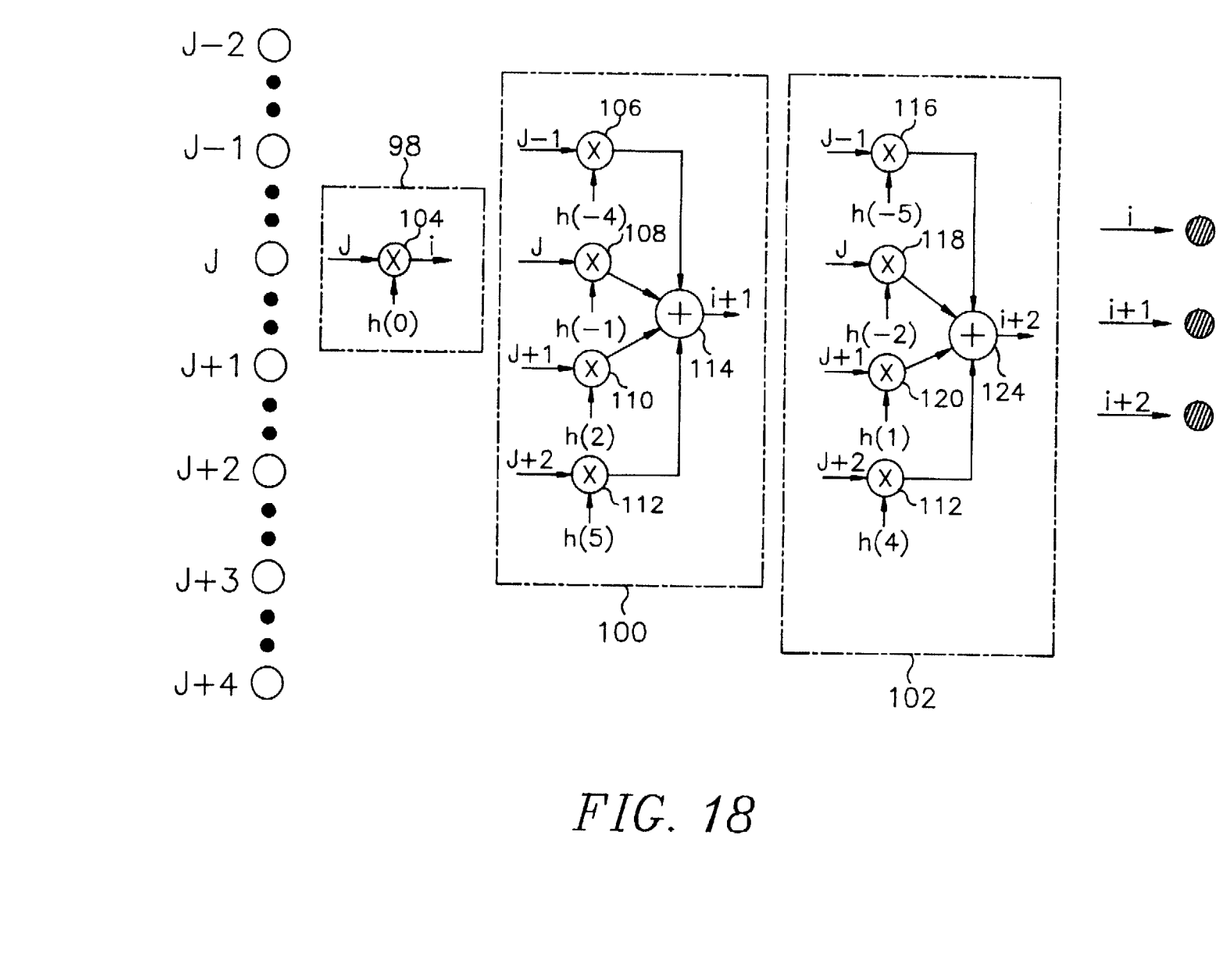
FIG. 18 is a view illustrating one example of a detailed construction of a low-pass filtering and sub-sampling part 96 shown in FIG. 15.

One example of the construction of the low-pass filtering and sub-sampling part 96 is shown in FIG. 18. In FIG. 18, for example, (J-2) to (J+4) represents the initial pixels of the vertical direction in seven consecutive horizontal scanning lines. The pixels colored in black are the pixel data having zero value, two of which are inserted between each of the initial pixels (J-2) to (J+4). Furthermore, slashed pixels represent the three new pixels i, (i+1), and (i+2) which are generated from the two initial pixels J and (J+1). At this time, the two initial pixels J and (J+1) are converted into six pixels by zero-insertion. Accordingly, a total of six low-pass filters would normally be required. However, only three results of the low-pass filtering are needed because one of the two zero-inserted pixels is extracted by performing the sub-sampling as described above among the six zero-inserted pixels. Consequently only the three low-pass filters, that is, the first, second, and third low-pass filters 98 to 102, are required. In the same manner as the first embodiment, only the initial pixels are multiplied by the filter coefficient and the pixels having zero value are not multiplied by the filter coefficient.

Accordingly, multiplier 104 of the first low-pass filter 98 respectively multiplies the initial pixels J by the filter coefficient h(0), to thereby generate new pixel i. Multipliers 106 to 112 of the second low-pass filter 100 respectively multiply the initial pixels (J-1), J, (J+1), and (J+2) by the filter coefficients h(-4), h(-1), h(2), and h(5) and adder 114 adds all outputs of the multipliers 106 to 112, to thereby generate new pixel (i+1). At this time, because the filter coefficients are not multiplied by the pixels having zero value, the filter coefficients h(-5), h(-3), h(-2), h(0), h(1), h(3), and h(4) are not used. Furthermore, multipliers 116 to 122 of the third low-pass filter 102 respectively multiply the initial pixels (J-1), J, (J+1), and (J+2) by the filter coefficients h(-5), h(-2), h(1), and h(4) and adder 124 adds all outputs of the multipliers 116 to 122, to thereby generate new pixel (i+2). At this time, because the filter coefficients are not multiplied by the pixels having zero value, the filter coefficients h(-4), h(-3), h(-1), h(0), h(2), h(3), and h(5) are not used.

As a result, the three new pixels i, (i+1), and (i+2) of the horizontal scanning lines which are vertically extended from the two initial pixels J and (J+1) of the horizontal scanning lines are generated.

The vertical height of the image of cinemascope size having 320 effective horizontal scanning lines is extended by sequentially repeating the above steps every two horizontal scanning lines, so that the image is converted to an image having 480 effective horizontal scanning lines. Accordingly, even in a television screen having a 16:9 aspect ratio as in FIG. 3, the image of the video source is not spread to the left and right and at the same time the upper and lower black bars do not appear.

Also, in case that the two horizontal scanning lines J and (J+1) are extended as described above to thereby generate the three horizontal scanning lines i, (i+1), and (i+2), that is, in case that the two initial pixels are converted to three pixels, the four pixels (J-1) to (J+2) of the horizontal scanning lines are required, as shown in FIG. 18. This can be more readily understood by referring to FIG. 17 where the pixels which are processed in the first, second, and third low-pass filter 98 to 102 of the low-pass filtering and sub-sampling part 96 are separately illustrated in a dotted line block.

On the other hand, if the write signal $\overline{WE}$ and the read signal $\overline{RE}$ for the field memory 88 are controlled to thereby move the sections of the input region and the vertical extension region as shown in FIG. 16, the screen can be moved in the vertical direction.

As illustrated above, the present invention has an advantage of ensuring stability of a circuit by performing identical processing irrespective of the scanning method of the video source. This is possible because a field separation is not required. In addition, the degree of resolution is improved by use of an improved frequency characteristic in comparison with the conventional frequency characteristic.

While there have been illustrated and described what are considered to be preferred embodiments of the present invention, it will be understood by those skilled in the art that various changes and modifications may be made, and equivalents may be substituted for elements thereof without departing from the true scope of the present invention. In particular, embodiments of the present invention, extending the vertical height of the image of the letter box or the cinemascope size have been illustrated, but the invention can be applied to any video signal having letter box format. Also, it has been illustrated that the image of the letter box size having 360 effective horizontal scanning lines and the image of the cinemascope size having 320 effective horizontal scanning lines are extended vertically to images having 480 horizontal scanning lines. However, cases where the number of effective horizontal scanning lines are different can also be applied to the present invention in the same manner. In such cases, the ratio of vertical extension corresponds to the ratio of the number of horizontal scanning lines of the video source to the number of effective horizontal scanning lines. Accordingly, the scope of the present invention should not be determined by the above embodiments, but should be determined by the claims and equivalents thereof.

What is claimed is:

1. An apparatus for vertically extending an image in order to display an input video signal having said image in letter box format having an aspect ratio of 4:3 on a screen having an aspect ratio of 16:9, said apparatus comprising:

a field memory for storing pixel data of initial horizontal scanning lines of an input region which will be extended vertically, among said initial horizontal scanning lines of a field unit being inputted, and outputting said pixel data of said horizontal scanning lines of a region which will be extended vertically among said stored pixel data;

line memories for sequentially inputting and delaying said stored pixel data outputted from said field memory by units of said initial horizontal scanning lines, the number of said line memories corresponding to a vertical extension ratio of said image; and low-pass filtering and sub-sampling means for low-pass filtering and su b-sampling by respectively multiplying filter coefficients, the value of the filter coefficients being determined by positions of new vertically extended horizontal scanning lines, by said pixel data of said initial horizontal scanning lines, each of said pixel data being delay-outputted with a different delay from said line memories, and by adding said multiplied pixel data in correspondence with said positions of said new horizontal scanning lines, to thereby output new pixel data of said new vertically extended horizontal scanning lines.

2. The apparatus as claimed in claim 1, wherein said low-pass filtering and sub-sampling means generates four of said new vertically extended horizontal scanning lines for each three of said initial horizontal scanning lines of said input video signal.

3. The apparatus as claimed in claim 2, wherein said low-pass filtering and sub-sampling means simultaneously performs a zero-insertion and said sub-sampling by not multiplying said filter coefficients by three pixel data having a zero value which are inserted between pixel data of said initial horizontal scanning lines outputted respectively from said line memories.

4. The apparatus as claimed in claim 1, wherein said low-pass filtering and sub-sampling means generates three of said new vertically extended horizontal scanning lines for two of said initial horizontal scanning lines of said input video signal.

5. The apparatus as claimed in claim 4, wherein said low-pass filtering and sub-sampling means simultaneously performs a zero-insertion and said sub-sampling by not multiplying said filter coefficients by two pixel data having a zero value which are inserted between pixel data of said initial horizontal scanning lines outputted respectively from said line memories.

6. A method for extending height of an image in order to display a video signal having said image in letter box format having an aspect ratio of 4:3 on a screen having an aspect ratio of 16:9, said method comprising the steps of:

inserting pixel data having zero value, the number of inserted pixel data being set in accordance with a vertical extension ratio, between pixels of initial horizontal scanning lines of an input video signal, thereby producing a zero-inserted signal; and generating new horizontal scanning lines for use in vertically extending said image by multiplying filter coefficients, the value of the filter coefficients being determined by a position of a corresponding one of the new horizontal scanning lines being generated, by every $n^{th}$ pixel of said zero-inserted signal, wherein n is one more than the number of said zero value pixel data inserted between each of said pixels of said initial horizontal scanning lines, thereby producing a spectrum elimination signal, and then sub-sampling the spectrum elimination signal in accordance with said vertical extension ratio.

7. The method as claimed in claim 6, wherein the step of inserting pixel data having zero value is performed simultaneously with said sub-sampling by not multiplying said filter coefficients by the pixel data having a zero value.

8. A method for vertically extending an image in order to display a video signal having said image of a letter box format having a 4:3 aspect ratio on a screen having 16:9 aspect ratio, said method comprising the steps of:

inserting three pixel data having zero value between pixels of horizontal scanning lines of an input video signal, thereby producing a zero-inserted signal; and generating new horizontal scanning lines for use in vertically extending said image by multiplying filter coefficients, the value of the filter coefficients being determined by a position of a corresponding one of the new horizontal scanning lines being generated, by every fourth pixel of said zero-inserted signal, thereby producing a spectrum elimination signal, and then sub-sampling the spectrum elimination signal by a 3:1 rate in a vertical direction.

9. The method as claimed in claim 8, wherein the step of inserting pixel data having zero value is performed simultaneously with said sub-sampling by not multiplying said filter coefficients by the pixel data having a zero value.

10. A method for vertically extending an image in order to display a video signal having said image of a letter box format having a 4:3 aspect ratio on a screen having a 16:9 aspect ratio, said method comprising the steps of:

inserting two pixel data having zero value between pixels of horizontal scanning lines of an input video signal, thereby producing a zero-inserted signal; and generating new horizontal scanning lines for use in vertically extending said image by multiplying filter coefficients, the value of the filter coefficients being determined by a position of a corresponding one of the new horizontal scanning lines being generated, by every third pixel of said zero-inserted signal, thereby producing a spectrum elimination signal, and then sub-sampling the spectrum elimination signal by a 2:1 rate in a vertical direction.

11. The method as claimed in claim 10, wherein the step of inserting pixel data having zero value is performed simultaneously with said sub-sampling by not multiplying said filter coefficients by the pixel data having a zero value.

* * * * *